United States Patent [19]

Benzmiller

[11] 3,860,109

[45] Jan. 14, 1975

[54] CABLE-DRIVEN TRANSMISSION FOR FREE STALL BARN CLEANERS

[76] Inventor: Thomas G. Benzmiller, P.O. Box 207, Stevens Point, Wis. 54481

[22] Filed: May 10, 1973

[21] Appl. No.: 359,142

[52] U.S. Cl............ 198/224, 74/242.11 C, 198/208, 242/47.5, 242/86.51, 254/175
[51] Int. Cl............................................. B65g 25/08
[58] Field of Search...... 198/208, 224; 74/242.11 C; 254/149, 175.3, 175.7, 175; 242/54 R, 147 R, 86.51, 47.5

[56] References Cited
UNITED STATES PATENTS

| | | | |
|---|---|---|---|
| 1,186,982 | 6/1916 | Hall............................ | 74/242.11 C |
| 1,835,617 | 12/1931 | Stewart....................... | 74/242.11 C |
| 2,794,538 | 6/1957 | Schenil........................ | 198/208 |
| 3,240,323 | 3/1966 | Kitson.......................... | 198/224 |

Primary Examiner—Evon C. Blunk
Assistant Examiner—Jeffrey V. Nase
Attorney, Agent, or Firm—Quarles & Brady

[57] ABSTRACT

A cable-driven transmission for a barn cleaner as used to clean a free stall barn incorporating tightener arms on the incoming and outgoing branches of the cable wrapped around a drive sheave to provide for automatic tightening of the slack branch of the cable about the sheave. Also, the transmission may incorporate a safety system for turning off the electrical power to the transmission wherein the transmission is mounted on a slide assembly adapted to allow limited movement of the transmission when a cleaning member driven by the transmission contacts an obstacle and is prevented from movement, whereupon such limited movement actuates a cut-off switch or similar mechanism.

5 Claims, 7 Drawing Figures

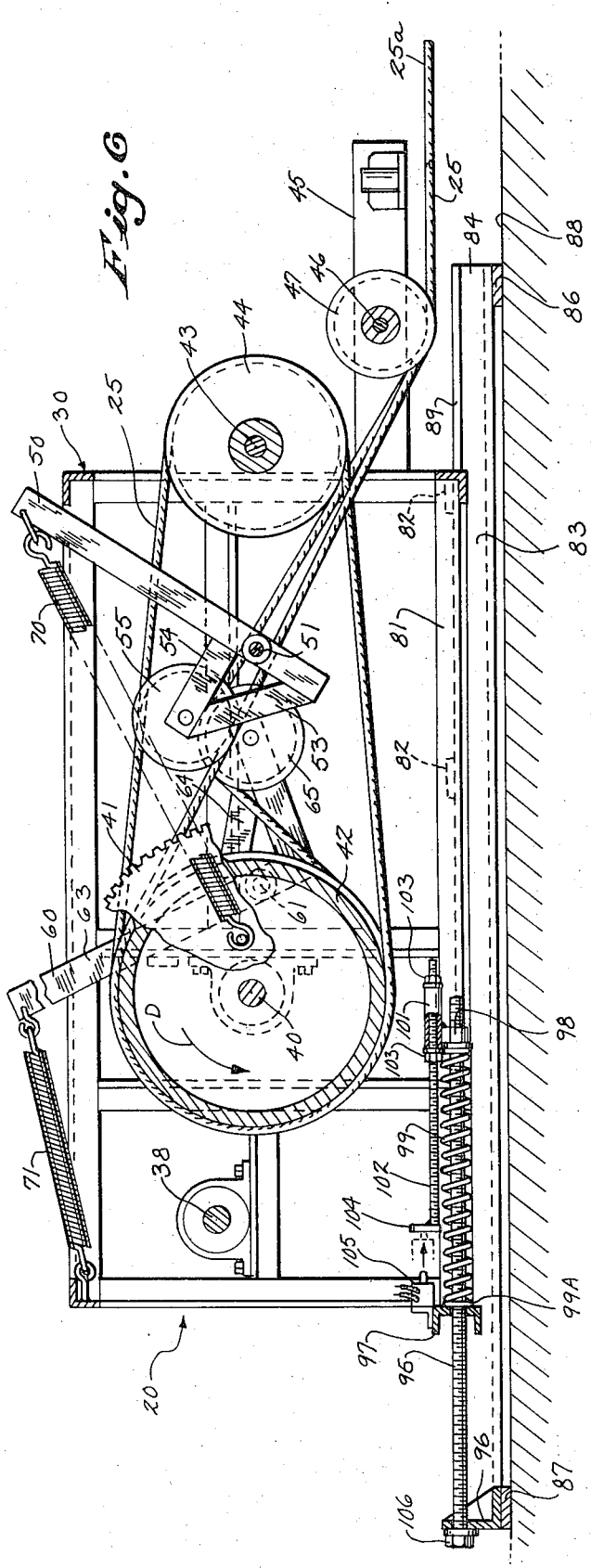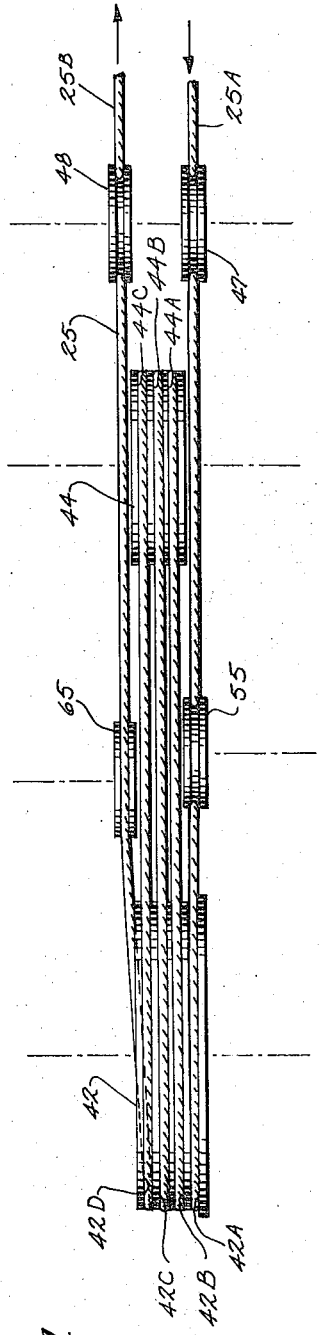

3,860,109

CABLE-DRIVEN TRANSMISSION FOR FREE STALL BARN CLEANERS

BACKGROUND OF THE INVENTION

1. Field of the Invention

This invention relates to the field of transmissions for barn cleaners of the type employing an endless cable carrying scrapers for cleaning the barn, which endless cable is driven by a drive sheave; the invention provides automatic tightening of the cable about the drive sheave even though one branch thereof is loose during normal operation, and provides automatic shut-off of the transmission in event an obstacle prevents free movement of the scraper or other cleaning member.

2. Description of the Prior Art

Free stall barns as a system for housing cows have become increasingly popular in recent years. Manure handling was an early problem as the alleys within the barn had to be scraped manually with a tractor, and running a tractor among the cattle often caused a disturbance to the cows which led to the chance for injury to the cattle; also, there was an increase in the amount of labor required to handle the cattle and dispose of the waste. Because of the high labor factor, many farmers would clean a barn only once a day, and even less often, which would cause the cattle to become very dirty. This situation led to the introduction of automatic power scrapers utilizing standard barn cleaner transmissions and barn cleaner chain. The chain-type automatic alley scrapers, however, proved to be very costly due to expense of the barn chain itself and the necessity to construct a channel in the center of the alley in which the chain would ride. The barn cleaner chain was constantly in contact with corrosive manure agents, had little or no chance to be oiled, and was in constant frictional engagement with the channel in which it rode; for this reason the chain exhibited a short useful life, oftentimes having to be replaced after only one year of use. Thus the high initial capital cost, high maintenance cost and high installation cost rendered the chain-type free stall barn cleaner too expensive for the average farmer.

The present invention relates to improvements for use of a cable-driven free stall barn cleaner. The scrapers utilized to clean individual alleys are driven by means of a continuous loop of steel cable which is preferably of stainless steel due to its high strength and ability to withstand the corrosive nature of a barn interior. The cable operated free stall barn cleaner, in comparison to a chain-driven unit, offered a low initial cost and low maintenance and installation costs, partly because the cable can be installed in a free stall barn without the need for special channels in the floor of the barn, cable has a lesser replacement cost than chain, and the elimination of the need to drag many pounds of deadweight chain around the barn. Also, a cable-driven transmission utilizing flexible cable facilitates its location in almost any conceivable place in the barn.

However, cable driven free stall barn transmissions encountered problems of keeping the cable tightly wrapped around the cable drive sheave employed in the transmission. Since the cable is driven in a reciprocating manner in which first one branch is driven and then the other, one side of the cable would always be slightly more loose than the other side, thereby leading to excessive or undue cable slippage on the drive sheave that would cause excessive wear in the sheave and possible breakage of the cable itself. Simply tightening the entire transmission enough to tighten the cable was not suitable, and did not solve such problems. An object of the present invention is to provide an automatic cable tightening and cable wrapping system in a cable-driven transmission of the type under consideration.

Barn cleaners of the type under consideration utilize a cable to drive scrappers which move up and down alleys within the barn to scrape the manure and other waste materials collected therein. From time to time, however, the scraper may hit a cow lying in the alley or other obstacle, necessitating a means for stopping the scrapers. Chain-driven barn cleaners often accomplish this by providing shear bolts on the main drive chain sprockets so that the bolts break to stop movement of the scrapers when the scrapers hit an obstacle; however, this does not stop the transmission and motor from operating and it is possible for the unit to run for several hours before someone turns it off after the bolts have sheared. Another main object of the present invention is to provide an improved type of safety device that will completely shut off all electrical current to a barn cleaner transmission when a scraper strikes an obstacle that prevents its continuing movement. The present system also provides that the unit cannot be started again until the obstacle is cleared.

SUMMARY OF THE INVENTION

In a cable-driven barn cleaner to which this invention relates, a cable is wrapped around a drive sheave that is connected to a motor and suitable gearing adapted to drive the sheave in both directions for reciprocating drive of the cable. According to my present invention, spring loaded tightener pulleys are provided, one for each branch of the cable wrapped around the drive sheave, which operate automatically to apply tension to the looser of the two branches of the cable, i.e. the cable which is not driven. The tightener pulleys, which are carried on pivoted tightener arms, function to tighten the non-driven cable branch to thereby insure that the slack branch is wrapped tightly about the drive sheave. The action of the tightener pulleys in this fashion is automatic and acts in response to the tension in the cable itself.

Secondly, my present invention provides for a safety system for interrupting electrical supply to the motor which drives a transmission according to which the transmission is mounted in a slide assembly utilizing a threaded member and compression spring arrangement. When the cable is tightened and the unit operating, if a scraper driven by the cable hits an obstacle, the compression spring compresses further and a push bolt attached to the spring contacts a safety limit switch which actuates to shut off the electrical current. Mounting the transmission in a slide assembly in this fashion also provides for efficient installation of the transmission and facilitates adjustment of the cable tension in appropriate manner. Once the obstacle is cleared from the alley, the transmission can be returned to its normal operating position for continued actuation.

BRIEF DESCRIPTION OF THE DRAWINGS

The ensuing description of several presently preferred embodiments of this invention is made with reference to the accompanying drawings wherein:

FIG. 6 is an enlarged side view with portions broken away, of the transmission of FIGS. 3-5, and FIG. 7 is a schematic view showing the manner in which the cable driven by the transmission of the previous drawings is arranged about the various sheaves associated with the transmission.

DESCRIPTION OF THE PREFERRED EMBODIMENTS

BACKGROUND DESCRIPTION

Figure 1:
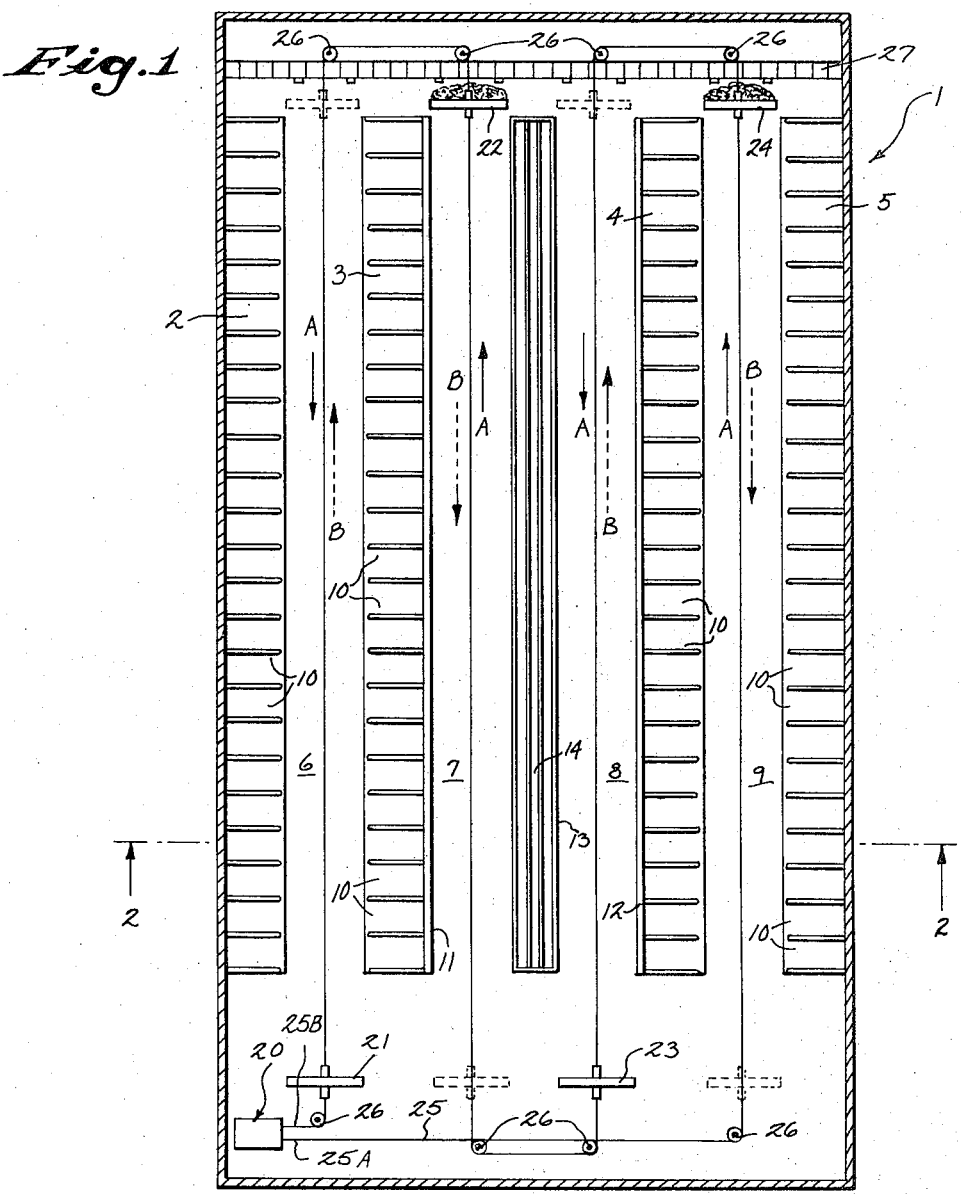
FIG. 1 is a plan view of a free stall barn of the type with which the transmission of the present invention is to be utilized.
Figure 2:
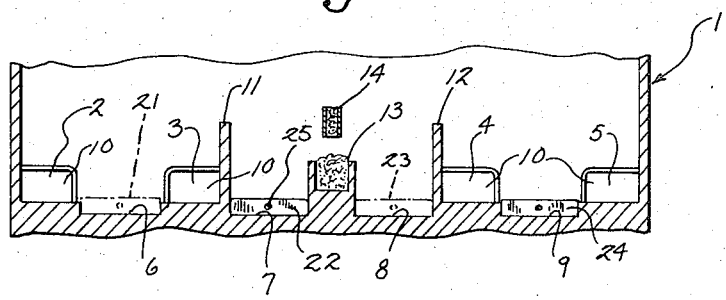
FIG. 2 is a cross sectional view, with portions broken away, of the barn shown in FIG. 1.

FIGS. 1 and 2 are plan and cross-sectional views, respectfully, of a dairy barn incorporating a barn cleaner transmission of the present invention. The barn 1 has four rows, 2, 3, 4 and 5 of animal stalls separated from one another by alleys 6, 7, 8 and 9. The outer rows of stalls, 2 and 5 are formed by a plurality of spaced stanchions 10 arranged between the floor and the exterior wall of the barn to define individual free stalls for the animals, while the inner rows 3 and 4 of free stalls are formed by a plurality of spaced stanchions 10 arranged between the floor of the barn and low intermediate walls 11 and 12 respectively which extend partly across the barn. A central feed bank 13 extends down the middle of the barn and is supplied from a suitable feeder 14 supported above the bunk. The cows move back and forth between their individual stalls and the feed bunk 13 to obtain food and drink, the illustrated style of the barn generally being referred to as a "free stall" barn.

The barn 1 is provided with a barn cleaner in order to remove animal refuse and debris, both liquid and solid, from the barn so as to maintain acceptable sanitation. The barn cleaner illustrated in FIG. 1 includes a transmission 20 mounted on the floor of the barn which drives cleaning means or members 21, 22, 23 and 24 as scrapers which are to travel along the floor of the barn as in the alleys 6, 7, 8 and 9 respectively. The cleaning means 21-24 are interconnected by sections of cable 25 which are trained about pulleys 26 suitably arranged on the floor of the barn. The ends 25A and 25B of the cable are each drivingly connected to the transmission 20. A cross conveyor 27 which may be a conveyor system or a pit extends across one end of the barn. The transmission 20 is operated to drive the cleaning means back and forth across their respective alleys so that the scrapers clean their respective alleys as they are moved towards the cross conveyor 27 during their cleaning cycle.

The transmission 20 is a reversing type mechanism. When the transmission 20 is operated to drive the cable in the direction shown by the arrow A in FIG. 1, the cleaning means 22 and 24 are driven in their cleaning cycle to move down their alleys 7 and 9 and contact the alley to convey refuse and debris collected therein towards and into the cross conveyor 27; the cleaning members 22 and 24 are shown near the end of the cleaning cycle of their travel in FIG. 1. During this movement, the cleaning members 21 and 23 are transported in their return cycle down their alleys to the end thereof remote from the cross conveyor 27, and they are rotated to be out of contact with the alley during this cycle of their travel. After the cleaning members 22 and 24 have conveyed material from their alleys to the cross conveyor, the transmission 20 is reversed to drive the cable 25 in the direction of the arrow B so that the cleaning members 21 and 23 can be transported in their cleaning cycle down their respective alleys 6 and 8 toward the cross conveyor 27, as shown by their dotted line positions, to scrape refuse and debris collected therein into the cross conveyor; during this motion, the cleaning members 22 and 24 are moved in their return cycle to the opposite ends of their alleys as illustrated by the dotted line positions in FIG. 1. Reversal of the transmission 20 can be accomplished by any suitable means, a useful system comprising magnetic relays at one end of two adjacent alleys together with magnets attached to the respective cleaning members so that the cleaning member can actuate the magnetic relay at one end of its movement to cause reversal of the transmission. The cross conveyor 27 includes a suitable conveying mechanism to transport the refuse and debris deposited therein by the cleaning members to a collection or storage point, which may typically be located outside the barn.

The cleaning members 21-24 are of the type which tilt along their axis so that they contact their respective alley as they are transported towards the cross conveyor 27 during their cleaning cycle, but are rotated into a position to be lifted above their respective alley as they are moved away from the cross conveyor during their return cycle. While the barn 1 is illustrated herein as having four rows of animal stalls, a typical installation may have lesser or more rows, typically for example 2, 3, 4 or 5 rows of animal stalls. The barn cleaner transmission 20 as described at this point is adapted to transport the cleaning means in a reciprocating motion along the floor of a barn, and the cleaning means are adapted to clean material from the barn floor during at least one cycle of the reciprocal travel therealong.

TRANSMISSION DESCRIPTION

Figure 3:
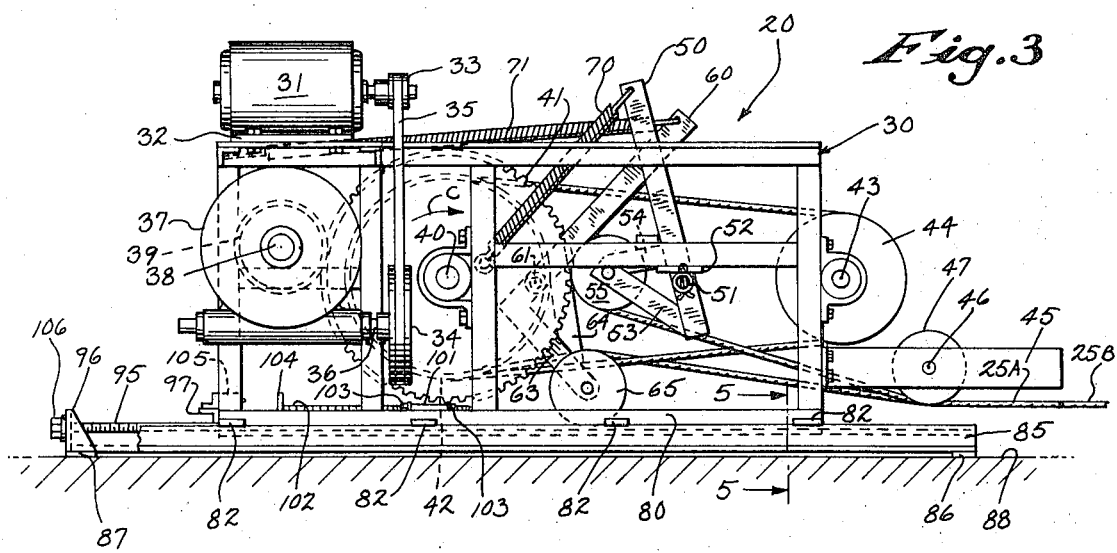
FIG. 3 is a side view of a barn cleaner transmission of the present invention.
Figure 4:
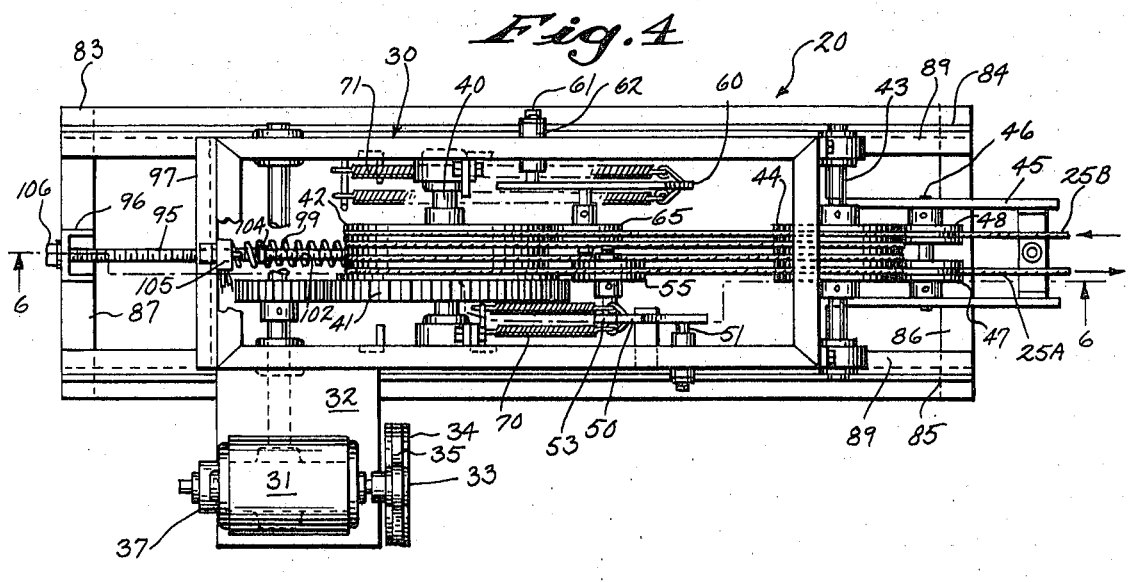
FIG. 4 is a plan view of the transmission shown in FIG. 3.

Structural details of the transmission 20 are illustrated in FIGS. 3-7. Referring first to FIGS. 3 and 4, the various operative elements of the transmission including gears, shafts, sheaves, etc. are supported in a frame 30 formed of a spaced horizontal and vertical structural members joined together to form a rigid structure. An instant-reversing electric motor 31 supported on a motor mount 32 attached to the frame 30 and includes a sheave 33 on its output shaft which drives sheave 34 by means of belt 35. The sheave 34 is mounted on the input shaft 36 of a speed reducer 37 which is mounted on the frame 30. The output shaft 38 of the speed reducer (best seen in FIG. 4) is journaled in suitable bearings attached to the frame 30 and carries a drive gear 39. A first shaft 40 is journaled in bearings attached to opposite sides of the frame 30 and carries a main gear 41 near one of its ends, the main gear being attached to a four-groove cable drive sheave 42 also carried on the first shaft. The motor and speed reducer thereby provide drive means to rotate the cable drive sheave 42 and such driving is to be reversible so as to rotate the sheave 42 in both directions. The main gear 41 meshes with the drive gear 39 and is driven thereby. A second shaft 43 is journaled in suitable bearings attached to the front end of the frame 30 and carries three individual cable idler sheaves 44 mounted side-by-side on the shaft 43. A bracket 45 is attached to the front of the frame 30 and carries a third shaft 46 on which spaced pulleys 47 and 48 are mounted.

A first tightener member or arm 50 carries a stub shaft 51 near one of its ends which is journaled in a block 52 attached to the frame 30 to enable pivotal movement of the tightener arm 50 relative to the frame. Brackets 53 and 54 attached to the tightener arm 50 support a cable contact means or pulley 55 carried on a suitable shaft attached to the brackets. On the other side of the frame 30, a second member or arm 60 carries a stub shaft 61 near one of its ends which is journaled in a block 62 attached to the frame to enable pivotal movement of the tightener arm 60. Brackets 63 and 64 are attached to the tightener arm 60 and support near their outer ends a second cable contact means pulley 65 journaled on a suitable shaft carried on the brackets.

Extension spring 70, shown herein as two springs side-by-side, although other constructions may be used, in attached between the upper end of the first tightener arm 50 and a fixed point on the frame 30 of the transmission. On the opposite side of the frame, an extension spring 71 is attached between the upper end of the second tightener arm 60 and a fixed point on the frame 30, the extension spring 71 also being illustrated as comprising two springs side-by-side.

The cable 25 is threaded through the transmission 20 in the following manner, which description is best illustrated in FIG. 7. Branch 25A of the cable is threaded under pulley 47, then under pulley 55 and over and around the first groove 42A of the drive sheave 42, under and around the first idler sheave 44A, back over and around the second groove 42B of drive sheave 42, under and around the second idler sheave 44B, back over and around the third groove 42C of drive sheave 42, under and around the third idler sheave 44C, back over and around the fourth groove 42D of drive sheave 42, thereafter passes over the top of pulley 65, and then passes under the pulley 48 and out the front of the transmission 30 as branch 25B.

The action of the tightener arms and their respective cable contact pulleys will now be described. When the transmission 20 is operated in a clockwise direction as shown by the arrow C in FIG. 3, the branch 25B of the cable will be reeled in over the drive sheave 42 and move the cleaning members 21-24 in one direction; during this movement, the branch 25A of the cable will be paid out from the sheave 42 and be non-driven or idle so that it will normally be slightly loose. However, when the drive is reversed and drive sheave 42 is driven in a counterclockwise direction as shown by the arrow D in FIG. 6, branch 25A of the cable 25 will be pulled around the drive sheave 42 in a driving condition whereas branch 25B of the cable will be non-driven or idle and loosely wound around the sheave 42. Thus in one direction of rotation, branch 25B will be driven and taut while branch 25A is non-driven or idle and slightly slack, and in the opposite direction of rotation branch 25A of the cable will be driven and taut and branch 25B will be non-driven or idle and slightly slack. In order to obtain the most efficacious operation of the cable drive transmission as illustrated herein, it is necessary that the slack in the cable be taken up as much as possible, and that such removal of slack occur automatically each time the motor reverses. The tightener members 50 and 60 provide this action. When the branch 25A of the cable is slack, referring now to FIGS. 3 and 4, extension spring 70 rotates the pivoted tightener arm 50 in such fashion that the pulley 55 wraps the cable around part of the drive sheave 42; during this time, the force set up in the driven branch 25B overcomes the force of the spring 71 so that the pulley 65 is pivoted in a downward condition away from the drive sheave 42 and the cable is fed tangentially onto the drive sheave 42. In the opposite direction of rotation, as shown in FIG. 6, the tension in the branch 25A of the cable overcomes the spring 70 so as to pivot the tightener arm 50 to its uppermost position in which the pulley 55 is moved away from the sheave 42 and the branch 25A is fed tangentially onto the drive sheave 42; simultaneously, however, due to the slack in the branch 25B of the cable, the spring 71 pivots tightener arm 60 into a position wherein the pulley 65 wraps the slack branch of cable around part of the drive sheave 42.

In the cable-driven barn cleaner installation as described to this point, the cable 25, together with the cleaning members 21-24 connected therewith, forms a continuous loop which is driven in two directions with the reversing transmission 20 and has two branches leading from the transmission, and the first branch being under tension while the second branch is slack as the transmission is driven in one direction of rotation, while the first branch is slack and the second branch under tension as the transmission is rotated in the opposite direction. The spring-biased pivoting tightener arms are adapted to wrap the slack branch of the cable around the cable drive sheave, and the spring-biasing force is such as to be overcome by tension in the cable which is being driven so that the tightener pulley operating on that branch is raised out of its slack-branch tightening position. This provides for automatic positioning of the tightener arm in accordance with the tension in its associated particular branch of the cable 25.

Figure 5:
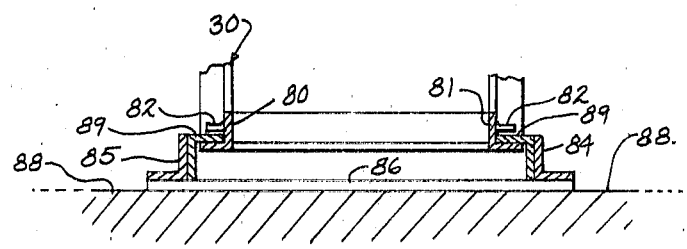
FIG. 5 is an end view of a portion of the transmission illustrated in FIGS. 3 and 4.

Another aspect of the present invention relates to the manner in which the transmission 20 is mounted on the floor of the barn. As illustrated in FIGS. 3-6, the bottom of the frame 30 in which the transmission 20 is supported includes a pair of spaced horizontal side members 80 and 81. A plurality of U-shaped channels 82 (see FIGS. 3 and 5) are attached to each of the side members 80 and 81, there being four shown as being attached to member 80 in FIG. 3. A frame slide member 83 formed of spaced side rails 84 and 85 interconnected by end members 86 and 87 is firmly attached to the floor 88 of the barn. Turning now to FIG. 5, each side rail 84 and 85 of the frame slide 83 includes an inwardly turned horizontal flange 89, that is spaced above the floor of the barn, and the U-shaped channel members 82 attached to the bottom side members 80 and 81 of the frame 30 engage the flange 89 of each side rail of the slide member 83 so that the frame 30 is slidable therealong. The purpose of the sliding engagement of the frame 30 with the frame slide member 83 will be discussed hereinafter.

Referring to FIG. 6, a long threaded tightener bolt 95 extends through a bracket 96 mounted on the rear end member 87 of the frame slide member 83. The tightener bolt 95 passes through an aperture formed in rear cross member 97 of the frame 30 and is threaded into a nut 98 carried on the end of a compression spring 99 which has its opposite end 99A attached to the rear cross member 97. The threaded nut 98 carries a block 101, and a push rod 102 extends through the block 101 and is held in place in a desired position by means of the bolts 103. The opposite end of the push rod is formed within an enlarged end portion 104. A shut off switch 105 is attached to the rear portion of the frame 30 and placed in such a position that it can be contacted to the enlarged end 104 of the push rod 102 for the purposes described below.

During the installation of the barn cleaner transmission, the frame 30 carrying the various operating mechanisms for the transmission is inserted in the frame slide member 83 mounted on the floor of the barn, with the U-shaped channels 82 engaging the flanges of the rails 84 and 85 of the frame slide member. The tightener bolt 95 is inserted in position as described previously, and the cable 25 is then installed about the various pulleys disposed about the floor of the barn, connected with the cleaning members, and also threaded through the transmission 20 in the matter described previously. Next, in order to tighten the cable to proper driving tension, the nut 106 on the end of the tightener bolt 95 is tightened with a wrench to thereby cause the frame 30 holding the transmission to move rearwardly, or left as viewed in FIG. 6, and thereby tighten the cable 25 to a suitable tension and also compress the compression spring 99. The length of the cable 25 is such that the spring 99 is not completely compressed at the time a suitable tension is achieved in this fashion. Thereafter the barn cleaner transmission is ready for operation. Thus the tightener bolt assembly provides for rectilinear movement of the frame 30 housing the transmission to enable accurate adjustment of the frame in order to achieve proper tensioning of the cable being driven by the transmission housed in the frame. The barn cleaner is then ready for operation to cause reciprocal movement of the cleaning members up and down their respective alleys by reversing the cable transmission at the appropriate times. However, it is usual in these types of installations for a cleaning member to contact an obstruction in one of the other cycles of its travel along its respective alley; for example, the scrapper may contact a cow that has fallen in its alley. If the transmission is permanently anchored to the floor of the barn, it is not possible for the cleaner to move the fallen cow without having a great likelihood of causing damage to the transmission itself by the resistance forces set up as the cleaning member contacts the cow. However, with the transmission construction as herein described, if a cleaning member 21-24 contacts a fallen cow or other obstruction in its alley, the frame 30 housing the transmission will be pulled forward, or to the right in FIG. 6, and against the compression spring 99 and this forward movement will continue until the cut-off switch 105 contacts the enlarged end 104 of the push rod 102; when this occurs, such contact will cause the electrical power to the motor driving the transmission 20 to be cut off, so that the operator can then clear the obstruction. Thus, the tightener bolt and its associated assembly allows sliding movement for a selected distance of the frame housing the transmission until a cut-off switch is contacted to thereby disconnect power to the transmission if an obstruction prevents movement of one of the scraping or cleaning members.

There has thus been described a cable-driven transmission for barn cleaners incorporating the principals of my present invention. The invention has been illustrated and described with reference to certain specific embodiments. For example, the tightener arm and spring actuation thereof has proved particularly useful, but other configurations for the arm and actuating means other than springs, e.g. mechanical pneumatic or hydraulic, could be used to effectively employ the principal of the tightener arm. The cable drive sheave may have a construction other than the four-groove sheave described, and there may be a different number of idler sheaves used in connection therewith. Other arrangements for connecting means between the slide and the frame incorporating the transmission elements could also be devised which will enable tightening of the cable and limited selective movement of the frame relative to the slide. It is expected that those skilled in the art can devise modifications of the embodiment described herein which will remain within the true spirit and scope of my present invention.

I claim:

1. A barn cleaner transmission for driving cleaning means in a reciprocating manner along a barn floor and including (a) a cable drive sheave, (b) a cable arranged about the cable drive sheave and having a first branch and a second branch extending therefrom for connection to the cleaning means, and (c) drive means to rotate the cable drive sheave in one direction in which the first branch of the cable is driven and under tension while the second branch is nondriven and slightly slack and also rotate the cable drive sheave in the opposite direction in which the second branch is driven and under tension while the first branch is non-driven and slightly slack, the cable drive sheave and the drive means being mounted on a frame, the improvement therein comprising:

a pivotable tightener arm for each of the first and second branches of the cable, each tightener arm being pivotally mounted on the frame,
1. contact means carried by each tightener arm for contacting its respective branch of the cable,
2. each tightener arm being pivotable between
    (i) a first position in which its contact means is moved towards the cable drive sheave to engage its respective cable branch and wrap the branch about part of the cable drive sheave and (ii) a second position in which its contact means is moved away from the cable drive sheave;

means connected between each tightener arm and the frame to rotate each tightener arm into its first position when its respective cable branch is non-driven and slightly slack and adapted to allow movement of the tightener arm to its second position when its respective cable branch is driven and under tension;

a slide affixed to the floor of the barn, the frame being inserted in the slide and horizontally movable relative thereto; and connecting means between the slide and the frame, the connecting means being adjustable to enable tightening of the cable and further being adapted to allow movement of the frame relative to the slide when an obstruction prevents movement of the cleaning means.

2. A barn cleaner transmission according to claim 1 further including:

first switch means carried on the slide and second switch means carried on the frame, the first and second switch means being spaced from one another when the cleaning means is driven during operation of the transmission and being adapted to contact one another to disconnect power to the drive means when the cleaning means contacts an obstruction and the frame moves a selected distance relative to the slide.

3. A barn cleaner transmission according to claim 1 wherein:

the connecting means between the slide and the frame consists of a threaded member which is adjusted to position the frame to tighten the cable, and spring means arranged about the threaded member to allow movement of the frame when an obstruction prevents movement of the cleaning means.

4. A barn cleaner transmission for driving cleaning means in a reciprocating manner along a barn floor and including (a) a cable drive sheave, (b) a cable arranged about the cable drive sheave and having a first branch and a second branch extending therefrom for connection to the cleaning means, and (c) drive means to rotate the cable drive sheave in one direction in which the first branch of the cable is driven and under tension while the second branch is non-driven and slightly slack and also rotate the cable drive sheave in the opposite direction in which the second branch is driven and under tension while the first branch is non-driven and slightly slack, the improvement therein comprising:

a frame on which the cable drive sheave and the drive means are mounted, a slide affixed to the floor of the barn, the frame being inserted in the slide and movable relative thereto, connecting means between the slide and the frame, the connecting means being adjustable to enable tightening of the cable and further being adapted to allow movement of the frame relative to the slide when an obstruction prevents movement of the cleaning means, and first switch means carried on the slide and second switch means carried on the frame, the first and second switch means being spaced from one another when the cleaning means is driven during operation of the transmission and being adapted to contact one another to disconnect power to the drive means when the cleaning means contacts an obstruction and the frame moves a selected distance relative to the slide.

5. A barn cleaner transmission for driving cleaning means in a reciprocating manner along a barn floor and including (a) a cable drive sheave, (b) a cable arranged about the cable drive sheave and having a first branch and a second branch extending therefrom for connection to the cleaning means, and (c) drive means to rotate the cable drive sheave in one direction in which the first branch of the cable is driven and under tension while the second branch is non-driven and slightly slack and also rotate the cable drive sheave in the opposite direction in which the second branch is driven and under tension while the first branch is non-driven and slightly slack, the improvement therein comprising:

a frame on which the cable drive sheave and the drive means are mounted, a slide affixed to the floor of the barn, the frame being inserted in the slide and moveable relative thereto, connecting means between the slide and the frame, the connecting means consisting of a threaded member which is adjusted to position the frame to tighten the threaded member which is adjusted to position the frame to tighten the cable and spring means arranged about the threaded member to allow movement of the frame relative to the slide when an obstruction prevents movement of the cleaning means, and first switch means carried on the slide and second switch means carried on the frame, the first and second switch means being spaced from one another when the cleaning means is driven during operation of the transmission and being adapted to contact one another to disconnect power to the drive means when the cleaning means contacts an obstruction and the frame moves a selected distance relative to the slide.

* * * * *

PO-1050
(5/69)

UNITED STATES PATENT OFFICE
CERTIFICATE OF CORRECTION

Patent No. 3,860,109          Dated Jan. 14, 1975

Inventor(s) Thomas G. Benzmiller

It is certified that error appears in the above-identified patent and that said Letters Patent are hereby corrected as shown below:

Col. 2, line 9, "scrappers" should be -- scrapers --.
Col. 3, lines 22-23, "respectfully" should be -- respectively --. Col. 3, line 34, "bank" should be -- bunk --. Col. 4, line 52, after "32" insert -- is --. Col. 5, line 25, "in" should be -- is --. Col. 7, line 11, "to" should be -- by --. Col. 7, line 45, "scrapper" should be -- scraper --. Col. 8, line 19, "embodiment" should be -- embodiments --.

Signed and sealed this 13th day of March 1975.

(SEAL)
Attest:

RUTH C. MASON
Attesting Officer

C. MARSHALL DANN
Commissioner of Patents
and Trademarks